US006401894B1

(12) United States Patent
Merkel et al.

(10) Patent No.: US 6,401,894 B1
(45) Date of Patent: Jun. 11, 2002

(54) MULTIPLE-CLUTCH ASSEMBLY

(75) Inventors: Harald Merkel, Egerlandstrasse (DE); Thomas Edward Braford, Jr., Newfound Gap, MI (US)

(73) Assignee: Borg-Warner Automotive GmbH (DE)

( * ) Notice: Subject to any disclaimer, the term of this patent is extended or adjusted under 35 U.S.C. 154(b) by 0 days.

(21) Appl. No.: 09/553,118

(22) Filed: Apr. 20, 2000

(30) Foreign Application Priority Data

May 12, 1999 (DE) .......................... 199 21 687

(51) Int. Cl.$^7$ .............................. F16D 25/14
(52) U.S. Cl. ................ 192/48.9; 192/70.17; 192/87.15; 192/212
(58) Field of Search ................ 192/48.9, 48.8, 192/70.17, 70.2, 212, 87.1, 87.15, 87.11, 87.14

(56) References Cited

U.S. PATENT DOCUMENTS

| 2,551,939 | A |   | 5/1951 | Gerst .......................... 192/48 |
| 2,687,198 | A | * | 8/1954 | Greenlee .................. 192/87.11 |
| 2,712,373 | A |   | 7/1955 | Smirl .......................... 192/103 |
| 3,589,483 | A |   | 6/1971 | Smith .......................... 192/3.52 |
| 4,732,253 | A |   | 3/1988 | Hiramatsu et al. ........ 192/87.11 |
| 4,813,524 | A |   | 3/1989 | Reik ........................ 192/106.2 |
| 5,662,198 | A |   | 9/1997 | Kojima .................... 192/87.11 |
| 5,711,409 | A | * | 1/1998 | Murata .................... 192/87.11 |

FOREIGN PATENT DOCUMENTS

| DE | 35 26 630 A1 | 5/1987 |
| DE | 91 14 528.7 | 12/1992 |
| DE | 43 32 466 C2 | 2/1998 |
| DE | 195 02 617 C2 | 9/1998 |
| GB | 2 036 203 | 11/1980 |

* cited by examiner

Primary Examiner—Charles A. Marmor
Assistant Examiner—Saúl Rodríguez
(74) Attorney, Agent, or Firm—Bliss, McGlynn P.C.; Greg Dziegielewski

(57) ABSTRACT

A multiple-clutch assembly includes a housing and a first clutch having a first drive member rotatably supported within the housing on a drive hub and a first driven member rotatably supported within the housing on a first driven shaft. A first clutch pack is interposed between the first drive and driven members and operable to selectively connect and disconnect the first drive and driven members for transferring and interrupting torque between the first drive and driven members. A second clutch is supported within the housing coaxial with respect to the first clutch and includes a second drive member rotatably supported within the housing on the drive hub and a second driven member rotatably supported within the housing on a second driven shaft. The first and second driven shafts are disposed concentrically relative to one another. A second clutch pack is interposed between the second drive and driven members and operable to selectively connect and disconnect the second drive and driven members for transferring and interrupting torque between the second drive and driven members. A torsional damper is connected between a source of power and the drive hub, thereby dampening torsional vibrations between the source of power and the first and second clutches.

5 Claims, 4 Drawing Sheets

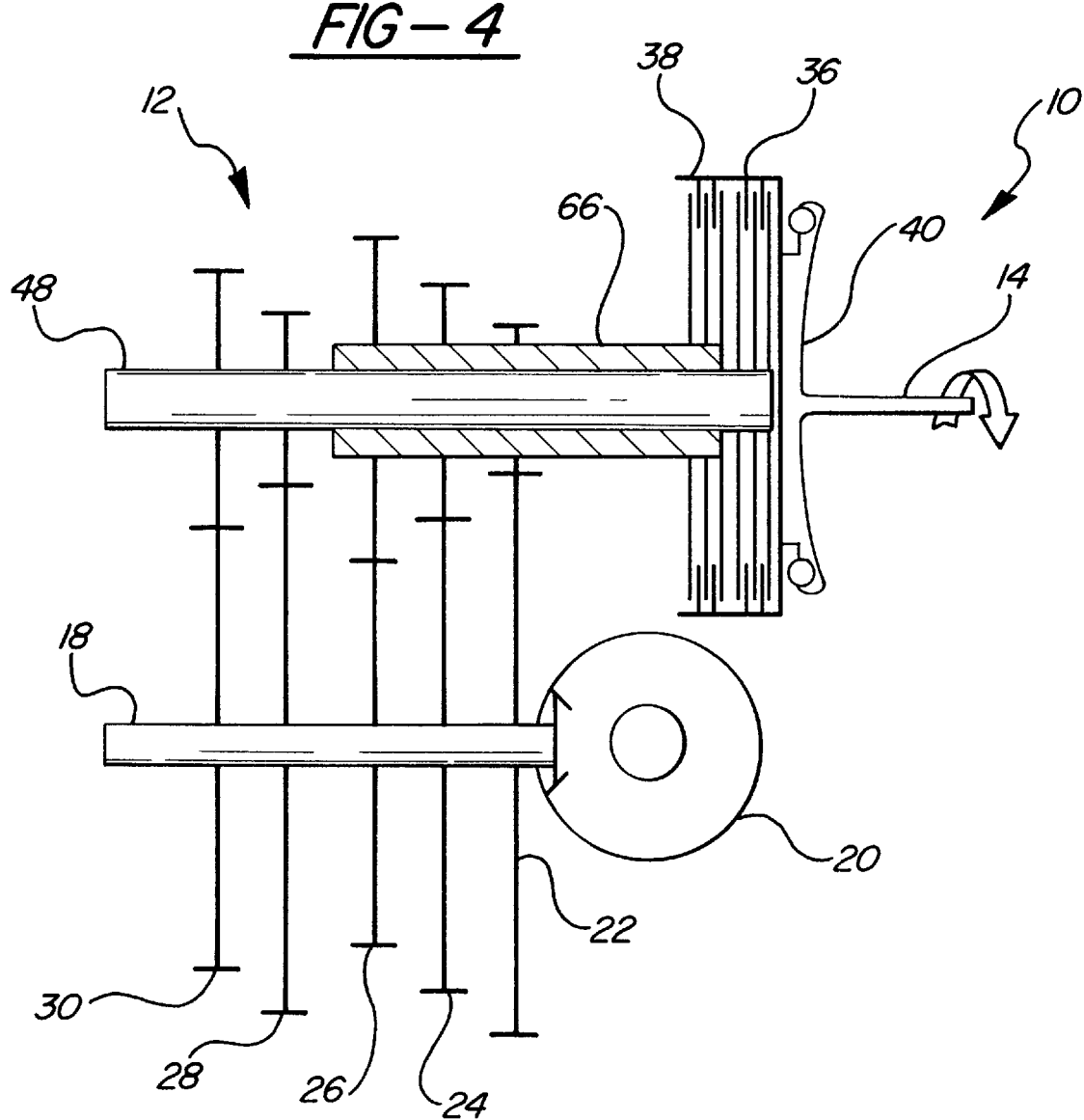

MULTIPLE-CLUTCH ASSEMBLY

BACKGROUND OF THE INVENTION

1. Field of the Invention

The present invention relates, generally, to friction devices, such as clutch or brake assemblies for use in transmissions, differentials, or brake systems. More specifically, the present invention relates to multiple-clutch or -brake assemblies.

2. Description of the Related Art

Friction devices are employed in a wide range of applications as clutches or brakes. For example, such friction devices are frequently used in land-based vehicles. Generally speaking, land-based vehicles require three basic components. These components include a power plant (such as an internal-combustion engine), a powertrain, and wheels. The powertrain's main component is typically referred to as the "transmission."

Engine torque and speed are converted in the transmission in accordance with the tractive-power demand of the vehicle. Transmissions include one or more gear sets, each of which may include an inner sun-gear, intermediate planet-gears supported by their carriers, and outer ring-gears. Various components of the gear sets are held or powered to change the gear ratios in the transmission.

The multi-disk pack clutch is a friction device that is commonly employed as a holding mechanism in a transmission or differential. Other multi-disk friction devices, such as wet brakes, also find use in industrial applications—for example, to brake the wheels on earth-moving equipment.

The multi-disk pack clutch or brake assembly has a clutch sub-assembly that includes a set of plates and a set of friction disks, the plates and friction discs being interleaved between one another. The plates and friction disks are bathed in a continual flow of lubricant and, in "open pack" operation, normally turn past one another without contact. Such clutch or brake assembly also typically includes a piston. When a component of a gear set is to be held, as, for example, during a particular gear range, a piston is actuated so as to cause the plates and friction disks to come into contact with respect to one another.

In certain applications, it is known to employ several multi-disk pack friction devices in combination to establish different drive connections throughout the transmission or differential to provide various gear ratios in operation or to brake a component. In double-clutch assemblies, for instance, one of the clutches is used for starting-up, and both clutches are used for shifting into intermediate gears.

German Patent DE 35 26 630 A1 discloses a double clutch adapted to be applied to a gear for changing the speed of a motor vehicle. To that end, two clutches alternately couple a central shaft and a hollow shaft that is concentric with the central shaft. Specifically, a disk of the clutch connected to the central shaft and a disk of the clutch connected to the hollow shaft can be pressed against a plate of a revolving-clutch casing.

German Patent DE 43 32 466 A1 discloses a double multi-disc clutch that encloses a powered, revolving casing. Each inner-disk assembly of the two clutches is torsionally fixed to a different center member. One center member is torsionally fixed on a shaft, and the other center member is torsionally fixed on a hollow shaft that is concentric with the other shaft such that one clutch surrounds the other, thereby reducing axial-design space.

The double-clutch assemblies described above having concentric shafts can be advantageously used with auxiliary-range transmissions. In particular, the shifting thrust during gear changes can be minimized or eliminated, and an interruption in propulsive power can be avoided.

However, multiple-clutch assemblies of the kind described above need improvement. Among other things, they cannot be used in and combined with a large number of transmission types and designs. In addition, numerous auxiliary units—such as oil pumps, filters, oil containers, sensors, solenoid valves, control-valve assemblies, electronic controls—are distributed across the entire transmission.

Thus, there is a need in the art for a multiple-clutch assembly that forms an extensive, self-sufficient unit; can be easily combined with transmissions of different designs and sizes; and reduces design space, weight, and manufacturing costs.

SUMMARY OF THE INVENTION

The present invention overcomes the disadvantages in the related art in a clutch assembly including a housing and a first clutch having a first drive member rotatably supported within the housing on a drive hub and a first driven member rotatably supported within the housing on a first driven shaft. A first clutch pack is interposed between the first drive and driven members and operable to selectively connect and disconnect the first drive and driven members for transferring and interrupting torque between the first drive and driven members.

A second clutch is supported within the housing coaxial with respect to the first clutch and includes a second drive member rotatably supported within the housing on the drive hub and a second driven member rotatably supported within the housing on a second driven shaft. The first and second driven shafts are disposed concentrically relative to one another. A second clutch pack is interposed between the second drive and driven members and operable to selectively connect and disconnect the second drive and driven members for transferring and interrupting torque between the second drive and driven members.

A torsional damper is connected between a source of power and the drive hub, thereby dampening torsional vibrations between the source of power and the first and second clutches.

Accordingly, one advantage of the present invention is that an extensive, self-sufficient multiple-clutch assembly is provided that can be easily combined with transmissions of different designs and sizes.

Another advantage of the present invention is that most, if not all, of the most important auxiliary units of a transmission can be incorporated within the present invention.

Another advantage of the present invention is that a modular constructional multiple-clutch assembly is provided that can be completely pre-manufactured, assembled, and tested.

Another advantage of the present invention is that it can be used with manual transmissions.

Another advantage of the present invention is that an especially large, effective centrifugal mass is created through a torsionally-fixed union of one of two centrifugal masses of the torsional damper and a bell, including its components, of one of the two clutches.

Finally, these advantages are achieved in a multiple-clutch assembly that reduces design space, weight, and manufacturing costs.

Other features and advantages of the present invention will be readily appreciated as the same becomes better understood after reading the subsequent description when considered in connection with the accompanying drawings.

BRIEF DESCRIPTION OF THE DRAWINGS

FIG. 4 is a schematic view of the multiple-clutch assembly of the present invention with a corresponding auxilary-range transmission.

DESCRIPTION OF THE PREFERRED EMBODIMENT(S)

Figure 1:
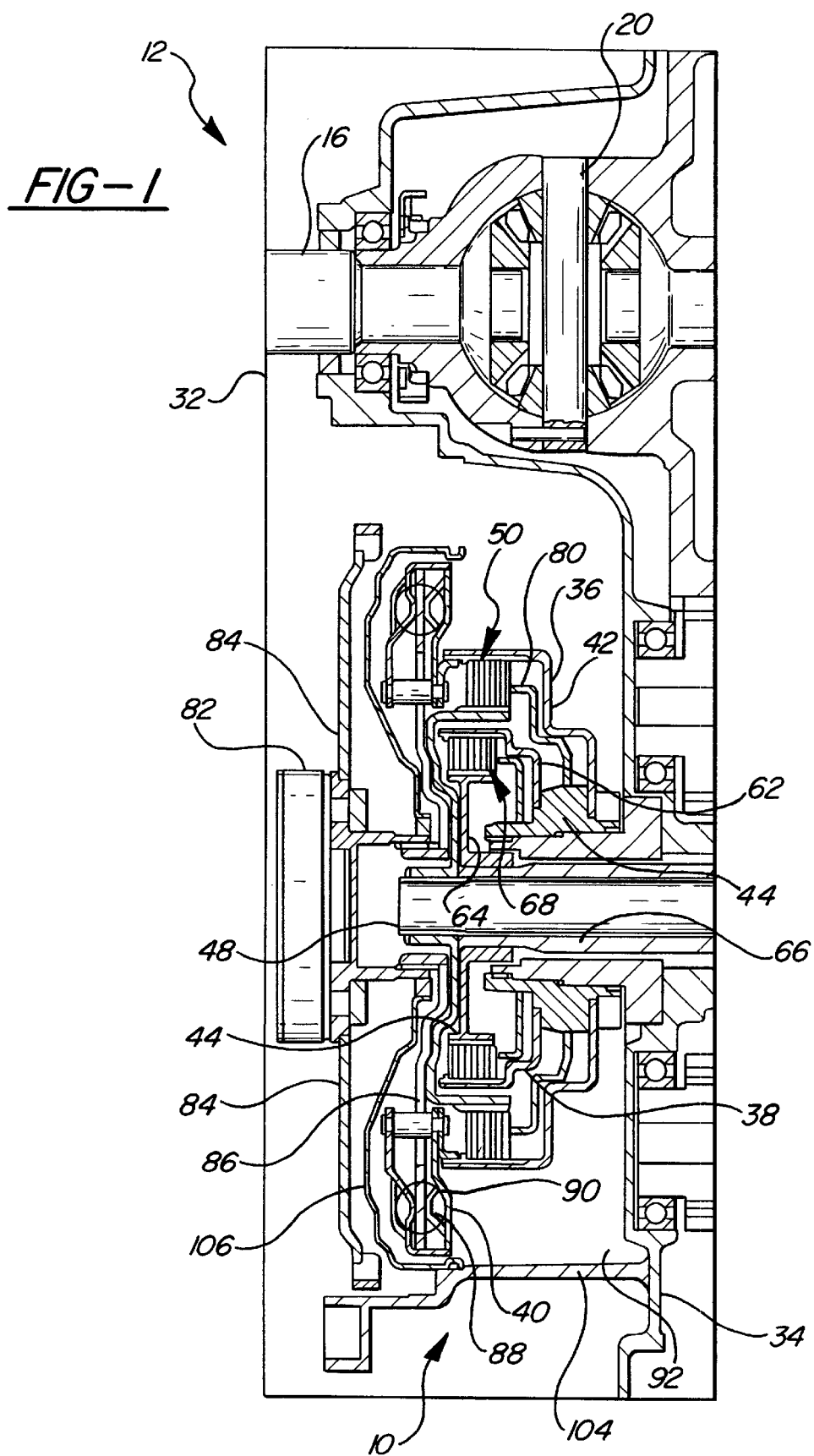
FIG. 1 is a cross-sectional side view of the multiple-clutch assembly of the present invention with a corresponding auxilary-range transmission.

Referring now to the figures, a friction device, such as a clutch assembly of the present invention, is generally indicated at 10. The clutch assembly 10 is adapted to be employed in connection with a transmission, an auxiliary-range transmission, a differential, or a brake system. For example only and not by way of limitation, as is commonly known in the art and best shown in FIG. 1 and schematically in FIG. 4, an auxiliary-range transmission, generally indicated at 12, typically includes an input shaft 14 that is operatively coupled to a prime mover, such as an internal-combustion engine (not shown). In an automotive application, the transmission 12 also includes an output shaft 16 that is operatively coupled to driven wheels (not shown) through other drivetrain components, such as a drive shaft (not shown) and an axle 18 having a differential 20. At least one gear set, and often a plurality of gear sets 22,24,26,28, 30, is operatively coupled between the input shaft 14 and the output shaft 16. A transmission casing 32 supports the input shaft 14, the output shaft 16, and the gear sets 22,24,26,28, 30 of the transmission 12.

Various components of the gear sets 22,24,26,28,30 are held or powered to change the gear ratio in the transmission 12. To this end, the transmission 12 will typically include at least one friction device 10. However, it will be appreciated by those having ordinary skill in the art that the transmission 12 may employ any number of friction devices adapted to hold or power gear sets to change the gear ratio of the transmission 12. Further and notwithstanding the automotive-related context of the discussion above, from the description that follows, those having ordinary skill in the art will appreciate that the present invention may be employed in a transmission, differential, or brake system, whether used in an automotive, non-automotive, or industrial application. Thus, to the extent the term "clutch" is used below in any context, this term should be given its broadest possible meaning, including, but not limited to, clutches and brakes for use in transmissions, differentials, or braking systems of all types.

Figure 2:
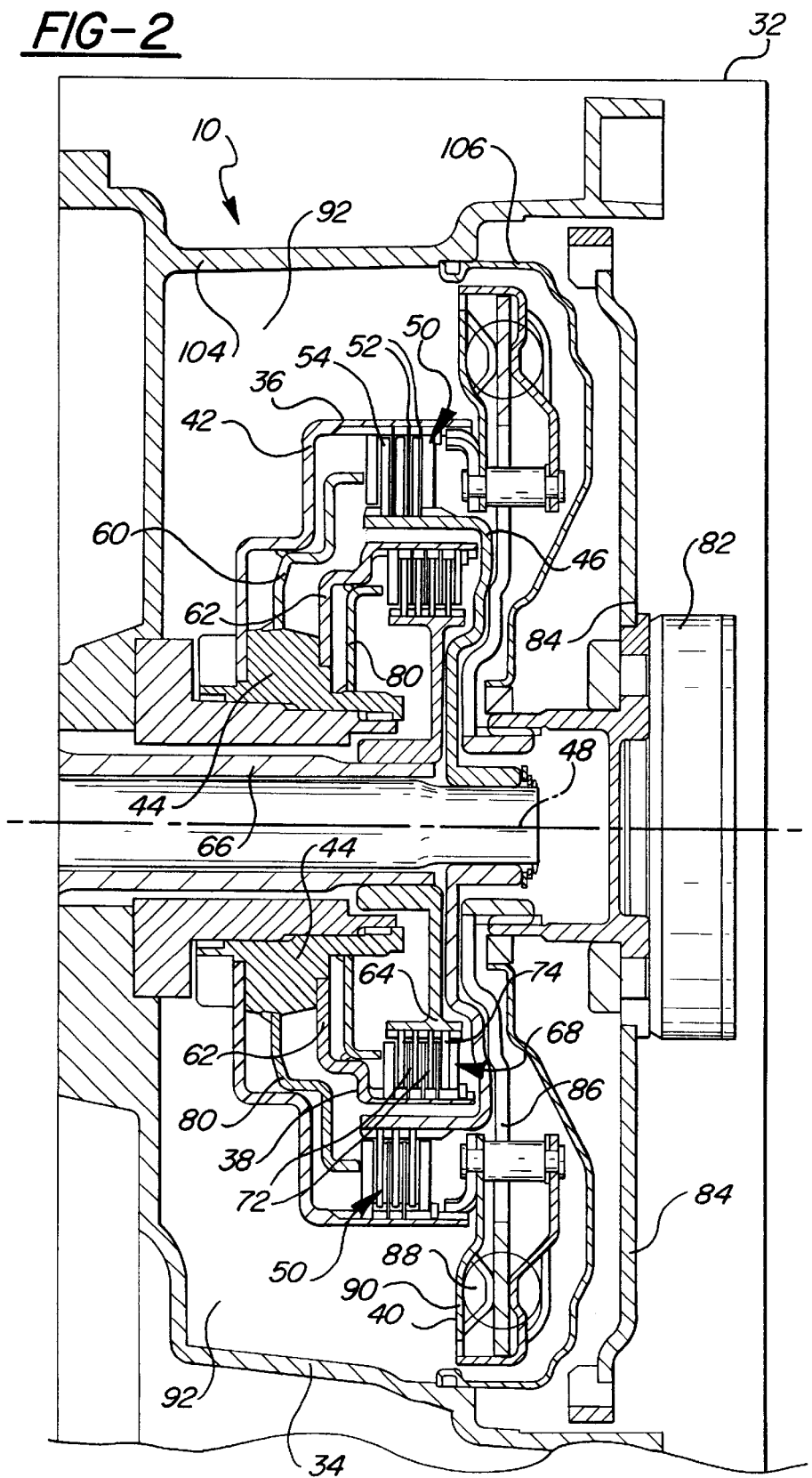
FIG. 2 is an enlarged view of the multiple-clutch assembly of the present invention shown in FIG. 1.
Figure 3:
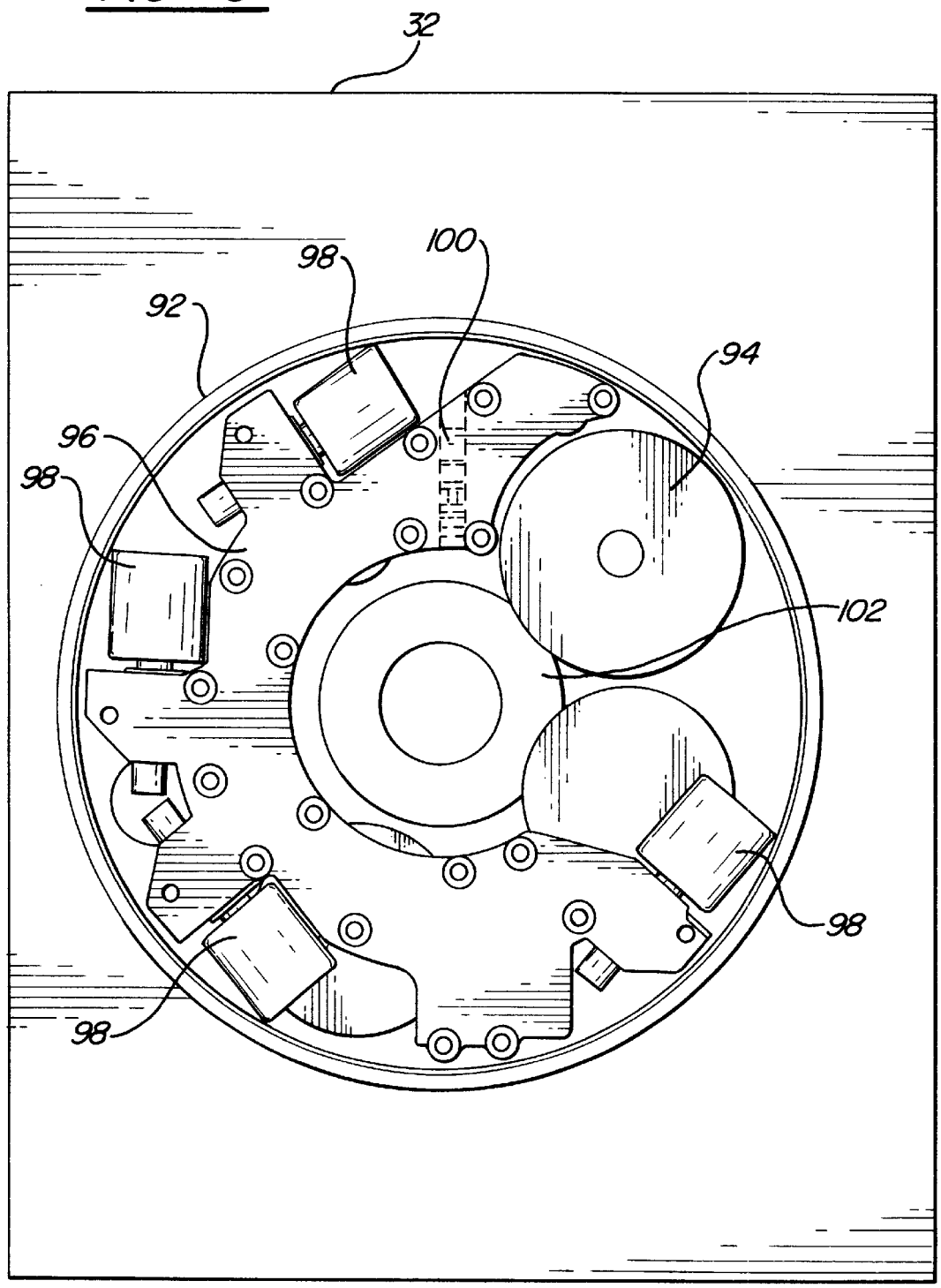
FIG. 3 is a top view of the multiple-clutch assembly of the present invention shown from the engine side.

Referring now to FIGS. 1–3, the clutch assembly 10 of the present invention is shown as a double-clutch assembly and primarily includes a housing 34, a first clutch 36, a second clutch 38, and a torsional damper 40.

The first clutch 36 includes a first drive member 42 rotatably supported within the housing 34 on a drive hub 44 and a first driven member 46 rotatably supported within the housing 34 on a first driven shaft 48. A first clutch pack 50 is interposed between the first drive member 42 and the first driven member 46 and operable to selectively connect and disconnect the first drive member 42 and the first driven member 46 for transferring and interrupting torque between the first drive member 42 and the first driven member 46.

In the preferred embodiment, the first clutch pack 50 includes a plurality of annular plates 52 and a plurality of annular friction disks 54, which are interleaved between the plates 52. The plates 52 are splined to the first drive member 42 for rotation with the first drive member 42, and the friction disks 54 are splined to the first driven member 46 for rotation with the first driven member 46. Also, a first clutch piston 60 is moveably supported within the housing 34 between disengaged and engaged positions with respect to the first clutch pack 50 to thereby actuate the first clutch 36 to connect and disconnect the first drive member 42 and the first driven member 46.

The second clutch 38 is supported within the housing 34 coaxial with respect to the first clutch 36 and includes a second drive member 62 rotatably supported within the housing 34 on the same drive hub 44 used to support the first drive member 42. The second clutch 38 also includes a second driven member 64 rotatably supported within the housing 34 on a second driven shaft 66. The first driven shaft 48 and the second driven shaft 66 are disposed concentrically relative to one another. A second clutch pack 68 is interposed between the second drive member 62 and the second driven member 64 and operable to selectively connect and disconnect the second drive member 62 and the second driven member 64 for transferring and interrupting torque between the second drive member 62 and the second driven member 64.

In the preferred embodiment, the second clutch pack 68 includes a plurality of annular plates 72 and a plurality of annular friction disks 74, which are interleaved between the plates 72. The plates 72 are splined to the second drive member 62 for rotation with the second drive member 62, and the friction disks 74 are splined to the second driven member 64 for rotation with the second driven member 64. Also, a second clutch piston 80 is moveably supported within the housing 34 between disengaged and engaged positions with respect to the second clutch pack 68 to thereby actuate the second clutch 38 to connect and disconnect the second drive member 62 and the second driven member 64.

In the preferred embodiment, the first clutch 36 defines an inner diameter and the second clutch 38 defines an outer diameter that is less than the inner diameter defined by the first clutch 36. Also, the first clutch 36 and the second clutch 38 are supported within the housing 34 in concentric relationship with respect to each other and adapted to be displaced relative to each other in an axial direction.

The torsional damper 40 is connected between a source of power, such as an internal-combustion engine (not shown), and the drive hub 44, thereby dampening torsional vibrations between the source of power and the first and second clutches 36,38. As is commonly known in the art, a flange 82 is adapted to receive the torque from the prime mover and is torsionally fixed to a flywheel 84 and the torsional damper 40.

In the preferred embodiment, the first drive member 42 is operably connected directly to the torsional damper 40 and acts to interconnect the second drive member 62 to the torsional damper 40 through the drive hub 44. The torsional damper 40 further includes a first centrifugal mass 86, a second centrifugal mass 90, and a plurality of springs 88 operatively supported therebetween. The springs 88 are adapted to accommodate circumferential rotation of the second centrifugal mass 90 relative to the first centrifugal mass 86 through a limited arc, thereby dampening torsional vibrations that commonly occur with such assemblies. The first drive member 42 is torsionally fixed to the second centrifugal mass 90.

In the preferred embodiment, the clutch assembly 10 is modular in design and further includes a sealed chamber 92. The chamber 92 is fluid-leak proof and adapted to house the first clutch 36, the second clutch 38, the torsional damper 40, and at least two auxiliary components of the transmission 12 from a group of such components. As illustrated in FIG. 3, such group may include: an oil pump 94, a control-valve assembly 96, solenoid valves 98, a hydraulic slide 100 for regulating the volume of an electronic control employed to control the actuation of the first clutch 36 and the second clutch 38, and a driving wheel 102 for the oil pump 94. As best shown in FIG. 2, the chamber 92 includes a wall 104 and a partition 106 for sealing the chamber 92 and lubricant for lubricating the components 36,38,40,94,96,98,100,102 disposed in the chamber 92. The first drive member 42, the wall 104, and the second centrifugal mass 90 enclose the at least two components 94,96,98,100,102.

As can be easily seen, the structure of the present invention allows the multiple-clutch assembly 10 to be extensive, self-sufficient, and easily combined with transmissions of different designs and sizes. Most, if not all, of the most important auxiliary units of a transmission can be incorporated within the multiple-clutch assembly 10. Also, the multiple-clutch assembly 10 is modularly constructional and can be completely pre-manufactured, —assembled, and —tested and used with manual transmissions. In addition, an especially large, effective centrifugal mass is created through the torsionally-fixed union of one of the two centrifugal masses 86,90 of the torsional damper 40 and the drive member 42,46 of one of the two clutches 36,38. Furthermore, the multiple-clutch assembly 10 reduces design space, weight, and manufacturing costs.

The present invention has been described in an illustrative manner. It is to be understood that the terminology that has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A multiple-clutch assembly comprising:

a housing, a first clutch including a first drive member rotatably supported within said housing on a drive hub and a first driven member rotatably supported within said housing on a first driven shaft, and a first clutch pack interposed between said first drive and driven members and operable to selectively connect and disconnect said first drive and driven members for transferring and interrupting torque therebetween;

a second clutch supported within said housing coaxial with respect to said first clutch, said second clutch including a second drive member rotatably supported within said housing on said drive hub and a second driven member rotatably supported within said housing on a second driven shaft, wherein said first and second driven shafts are disposed concentrically relative to one another, and a second clutch pack interposed between said second drive and driven members and operable to selectively connect and disconnect said second drive and driven members for transferring and interrupting torque therebetween; and a torsional damper connected between a source of power and said drive hub through said first drive member of said first clutch that is, operably connected directly to said first drive member of said first clutch and thereby acting to interconnect said second drive member of said second clutch to said torsional damper through said drive hub, and dampening torsional vibrations between said source of power and said first and second clutches.

2. A multiple-clutch assembly as set forth in claim 1, wherein said first clutch defines an inner diameter and said second clutch defines an outer diameter that is less than said inner diameter defined by said first clutch, said first and second clutches supported within said housing in concentric relationship with respect to each other.

3. A multiple-clutch assembly as set forth in claim 1, wherein said first clutch pack includes a plurality of annular plates splined to said first drive member for rotation therewith, a plurality of annular friction disks splined to said first driven member for rotation therewith and interleaved between said plates, and a first clutch piston moveably supported within said housing between disengaged and engaged positions with respect to said first clutch pack to thereby actuate said first clutch to connect and disconnect said first drive and driven members.

4. A multiple-clutch assembly as set forth in claim 1, wherein said second clutch pack includes a plurality of annular plates splined to said second drive member for rotation therewith, a plurality of annular friction disks splined to said second driven member for rotation therewith and interleaved between said plates, and a second clutch piston moveably supported within said housing between disengaged and engaged positions with respect to said second clutch pack to thereby actuate said second clutch to connect and disconnect said second drive and driven members.

5. A multiple-clutch assembly as set forth in claim 1, wherein said clutch assembly includes at least two components supported within said housing from the group of components including an oil pump, a control-valve assembly, solenoid valves, a hydraulic slide for regulating the volume of an electronic control employed to control the actuation of said first and second clutches, and a driving wheel for the oil pump.

* * * * *